United States Patent
Ishiguro et al.

(10) Patent No.: US 9,484,563 B2
(45) Date of Patent: Nov. 1, 2016

(54) BATTERY PACK (71) Applicant: KABUSHIKI KAISHA TOYOTA JIDOSHOKKI, Aichi-ken (JP)

(72) Inventors: Fumihiko Ishiguro, Kariya (JP); Takayuki Kato, Kariya (JP); Hiromi Ueda, Kariya (JP); Hirohisa Kato, Kariya (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 0 days.

(21) Appl. No.: 14/420,559

(22) PCT Filed: Jun. 19, 2014

(86) PCT No.: PCT/JP2014/066284
§ 371 (c)(1),
(2) Date: Feb. 9, 2015

(87) PCT Pub. No.: WO2015/001972
PCT Pub. Date: Jan. 8, 2015

(65) Prior Publication Data
US 2015/0221910 A1 Aug. 6, 2015

(30) Foreign Application Priority Data

Jul. 4, 2013 (JP) ................................ 2013-140797
Dec. 26, 2013 (JP) ................................ 2013-270527

(51) Int. Cl.
*H01M 2/04* (2006.01)
*H01M 2/10* (2006.01)
*H01M 2/12* (2006.01)

(52) U.S. Cl.
CPC ......... *H01M 2/1077* (2013.01); *H01M 2/1016* (2013.01); *H01M 2/1223* (2013.01); *H01M 2/1235* (2013.01); *H01M 2220/20* (2013.01)

(58) Field of Classification Search
None
See application file for complete search history.

(56) References Cited

U.S. PATENT DOCUMENTS

| 2002/0187380 | A1 | 12/2002 | Tanaka et al. | |
|---|---|---|---|---|
| 2005/0170240 | A1 | 8/2005 | German et al. | |
| 2008/0160395 | A1 | 7/2008 | Okada et al. | |
| 2010/0273034 | A1* | 10/2010 | Hermann et al. | ............... 429/62 |
| 2012/0086176 | A1 | 4/2012 | Kondo et al. | |
| 2012/0263982 | A1 | 10/2012 | Yasui et al. | |

(Continued)

FOREIGN PATENT DOCUMENTS

| CN | 101212032 | 7/2008 |
|---|---|---|
| EP | 2244318 | 10/2010 |

(Continued)

OTHER PUBLICATIONS

Search report from International Bureau of WIPO, Application No. PCT/JP2014/066284, mail date is Aug. 5, 2014.

(Continued)

*Primary Examiner* — Cynthia K Walls
(74) *Attorney, Agent, or Firm* — Greenblum & Bernstein, P.L.C.

(57) ABSTRACT

A battery pack includes a sealed case and a battery cell accommodated in the sealed case. The sealed case includes a case body, which has an opening, and a lid member, which is fixed to the case body by a plurality of bolts and closes the opening. When distances between adjacent ones of the bolts are compared, the distance between a specific adjacent pair of the bolts is greater than that between any other adjacent pair of the remaining bolts.

8 Claims, 5 Drawing Sheets

(56) References Cited

U.S. PATENT DOCUMENTS

| | | | |
|---|---|---|---|
| 2012/0308858 A1 | 12/2012 | Hermann et al. | |
| 2012/0308859 A1 | 12/2012 | Hermann et al. | |
| 2013/0143081 A1 | 6/2013 | Watanabe et al. | |
| 2015/0037633 A1 | 2/2015 | Akiyama et al. | |

FOREIGN PATENT DOCUMENTS

| | | |
|---|---|---|
| JP | 2001-148235 | 5/2001 |
| JP | 2002-367647 | 12/2002 |
| JP | 2004-063352 | 2/2004 |
| JP | 2004-178909 | 6/2004 |
| JP | 2005-244103 | 9/2005 |
| JP | 2006-140023 | 6/2006 |
| JP | 2008-021486 | 1/2008 |
| JP | 2009-146812 | 7/2009 |
| JP | 2011-198570 | 10/2011 |
| JP | 2012-097896 | 5/2012 |
| JP | 2013-229182 | 11/2013 |
| WO | 2012/036190 | 3/2012 |
| WO | 2012/073438 | 6/2012 |

OTHER PUBLICATIONS

Written Opinion of the International Search Authority for PCT/JP2014/066284 with translation having a mail date of Aug. 5, 2014.
Japan Office action for JP Patent App. No. 2013-270527 having a mail date of Oct. 21, 2014.
Extended European Search Report for EP 14819366.7 dated Jun. 25, 2015.
Chinese Office Action for CN App. No. 201480002127.5 dated Sep. 6, 2015, along with English-language translation thereof.

* cited by examiner

Fig.7

BATTERY PACK

FIELD OF INVENTION

The present invention relates to a battery pack that includes a battery cell accommodated in a sealed case.

BACKGROUND OF THE INVENTION

In a battery pack that includes a battery cell accommodated in a sealed case, it is necessary to reduce the internal pressure in the sealed case when the internal pressure in the sealed case is increased. For example, a sealing type rechargeable battery disclosed in Patent Document 1 includes a box-like battery jar including a plurality of successively provided battery jar members. Each battery jar member accommodates a group of electrode plates with electrolytic solution. A gas collective portion is provided in the box-like battery jar. Between the gas collective portion and each battery jar member, a gas discharge portion, which opens if the internal pressure in each battery jar member is greater than or equal to a predetermined pressure, is provided. A gas outlet, which conducts the gas to the outside, is provided in the gas collective portion. If gas is generated in each battery jar member and the internal pressure increases, the gas is discharged through a gas discharge port to the gas collective portion. This reduces the internal pressure of each battery jar member. The gas discharged to the gas collective portion is conducted to the outside through the gas outlet.

PRIOR ART DOCUMENT

Patent Document

Patent Document 1: Japanese Laid-Open Patent Publication No. 2004-178909

SUMMARY OF THE INVENTION

As for the sealing type rechargeable battery disclosed in Patent Document 1, it is necessary to provide a gas collective portion, which is in communication with the discharge port of each battery jar member, and provide a gas outlet in the gas collective portion. This complicates the shape of the battery.

An objective of the present invention is to provide a battery pack that reduces the internal pressure of a sealed case with a simple structure.

According to a first aspect to achieve the above described objective, a battery pack includes: a sealed case; and a battery cell accommodated in the sealed case. The sealed case includes a case body, which has an opening, and a lid member, which is fixed to the case body by a plurality of bolts and closes the opening. When distances between adjacent ones of the bolts are compared, the distance between a specific adjacent pair of the bolts is greater than that between any other adjacent pair of the remaining bolts.

According to a second aspect to achieve the above described objective, a battery pack includes: a sealed case; and a battery cell accommodated in the sealed case. The sealed case includes a case body, which has an opening, and a polygonal lid member, which is fixed to the case body by a plurality of bolts that are aligned at even intervals and closes the opening. In the lid member, a distance from at least one of corners to a corresponding nearest bolt is greater than a distance from any one of the remaining corners to a corresponding nearest bolt.

According to a third aspect to achieve the above described objective, a battery pack includes: a sealed case; and a battery cell accommodated in the sealed case. The sealed case includes a case body, which has an opening, a polygonal lid member, and a plurality of bolts. The lid member is provided on an opening edge portion, which defines the opening of the case body, and closes the opening. The bolts fasten the lid member onto the opening edge portion. The bolts include two proximate bolts that are close to one of corners of the lid member and a plurality of distant bolts provided at positions farther from the one of the corners than the two proximate bolts are. The lid member includes a first region and a second region. The first region receives a fastening force from each of the two proximate bolts at a portion facing the opening edge portion. The second region receives a fastening force from each of two adjacent distant bolts. A fastening force of a portion of the first region in which a resultant force of the fastening force received from each of the two proximate bolts is the weakest is weaker than a fastening force of a portion of the second region in which a resultant force of the fastening force received from each of the two adjacent distant bolts is the weakest.

DETAILED DESCRIPTION OF THE PREFERRED EMBODIMENTS

First Embodiment

Hereinafter, a battery pack according to a first embodiment will be described.

Figure 1:
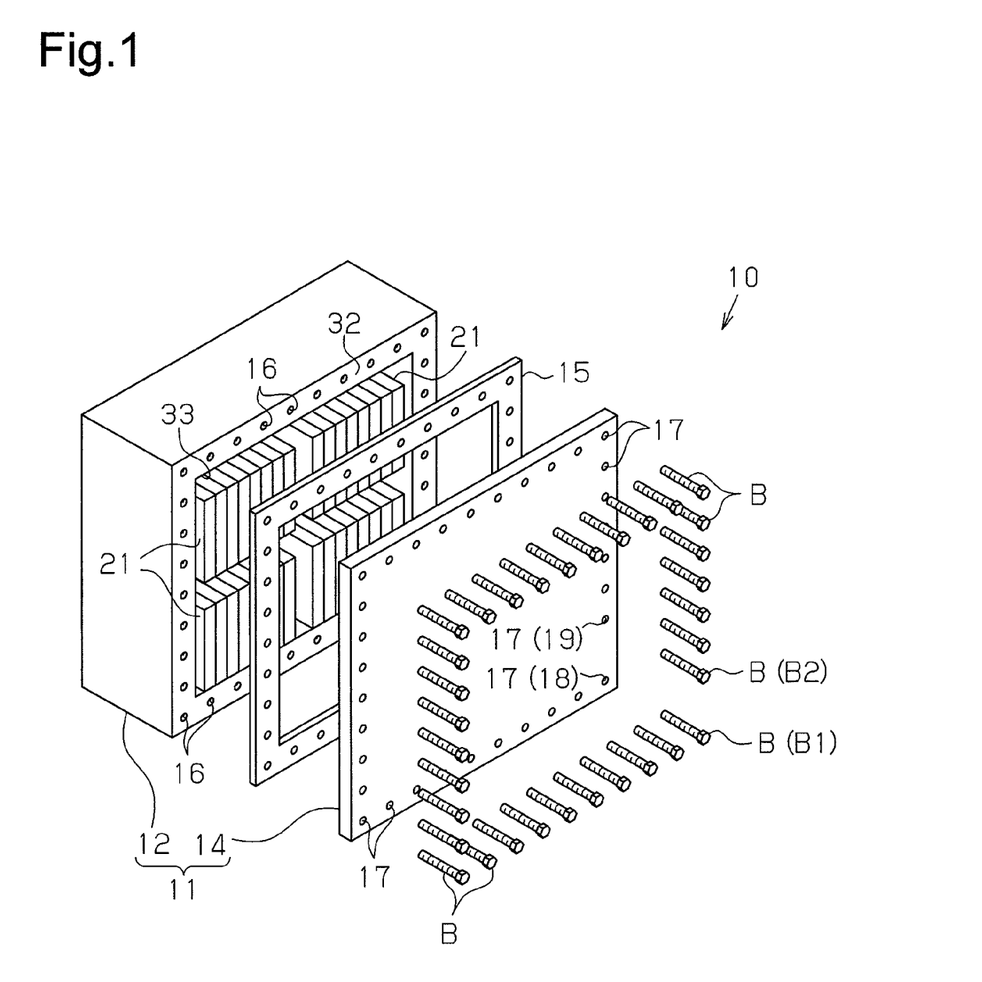
FIG. 1 is an exploded perspective view illustrating a battery pack according to a first embodiment.

As shown in FIG. 1, a battery pack 10 includes a sealed case 11 that accommodates a plurality of battery modules 21. The sealed case 11 includes a box-like tubular case body 12 with a closed end. More specifically, the case body 12 according to the present embodiment includes a tetragonal bottom plate and four side walls, which project from the four sides of the bottom wall. The opening 33 of the case body 12 is closed by a rectangular plate-like lid member 14 fixed to the case body 12 by a plurality of bolts B that are arranged side by side. The bolts B are all the same. A sealing member 15 is provided between the case body 12 and the lid member 14.

In the case body 12, threaded holes 16, into which the corresponding bolts B are screwed, are formed in an end surface of an opening edge portion 32, which defines the opening 33. The opening edge portion 32 is located on the ends of the side walls opposite to the bottom plate. Similarly, through holes 17, through which the corresponding bolts B pass, are formed in the circumferential edge of the lid member 14. The bolts B pass through the corresponding through holes 17 formed in the lid member 14 and are screwed into the corresponding threaded holes 16 in the case body 12. This fixes the lid member 14 to the case body 12. The lid member 14 is provided on the opening edge portion 32. This closes the opening 33 defined by the opening edge portion 32.

Figure 2:
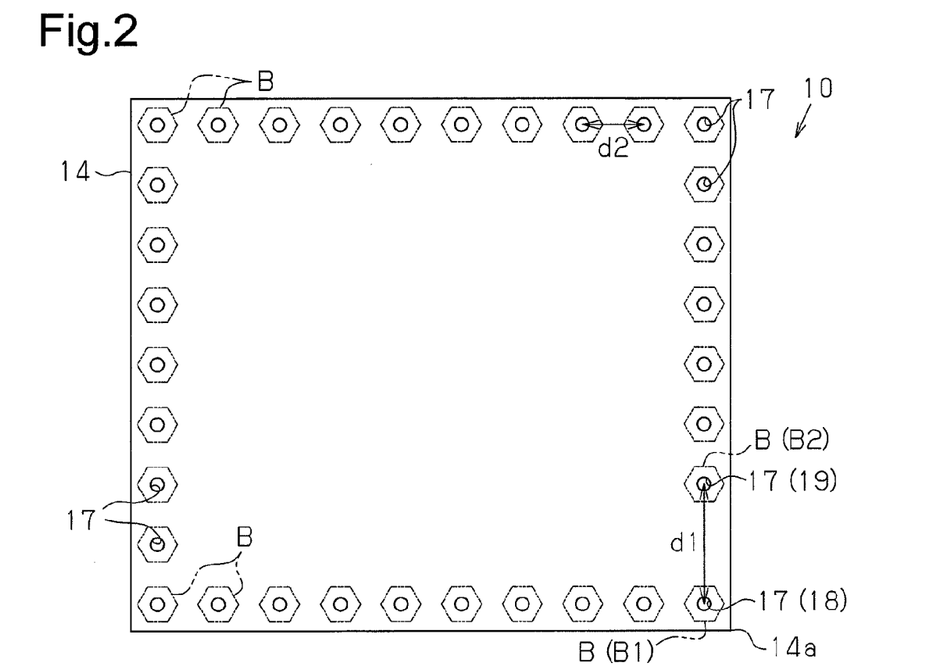
FIG. 2 is a front view illustrating the battery pack according to the first embodiment.

As shown in FIG. 2, among the distances between adjacent pairs of the through holes 17, the distance between the first through hole 18, which is located nearest to the corner 14a, and the second through hole 19, which is adjacent to the first through hole 18, is the greatest. The distances between any other adjacent pair of the remaining through holes 17, the distance between the first through hole 18 and the through hole 17, and the distance between the second through hole 19 and the through hole 17 are set to be equal. "Equal" means that differences caused by manufacturing errors are permitted.

According to the present embodiment, the distance between the first through hole 18 and the second through hole 19 is set twice the distances between each pair of the remaining through holes 17. The bolts B pass through the corresponding through holes 17. Accordingly, the distance d1 between the first bolt B1, which passes through the first through hole 18, and the second bolt B2, which passes through the second through hole 19, (distance between the centers of the shafts of the bolts B) is set twice the distances d2 between each pair of the remaining bolts B.

The distance between the first bolt B1 and the bolt B that is adjacent to the first bolt B1 and the distance between the second bolt B2 and the bolt B that is adjacent to the second bolt B2 are the same as the distances d2 between each pair of the remaining bolts B. That is, when the distances between adjacent pairs of the bolts B are compared, the distance d1 between the first bolt B1 and the second bolt B2 is greater than the distances d2 between each adjacent pair of the remaining bolts B. Accordingly, the first bolt B1 and second bolt B2 correspond to the two specific adjacent bolts.

Figure 3:
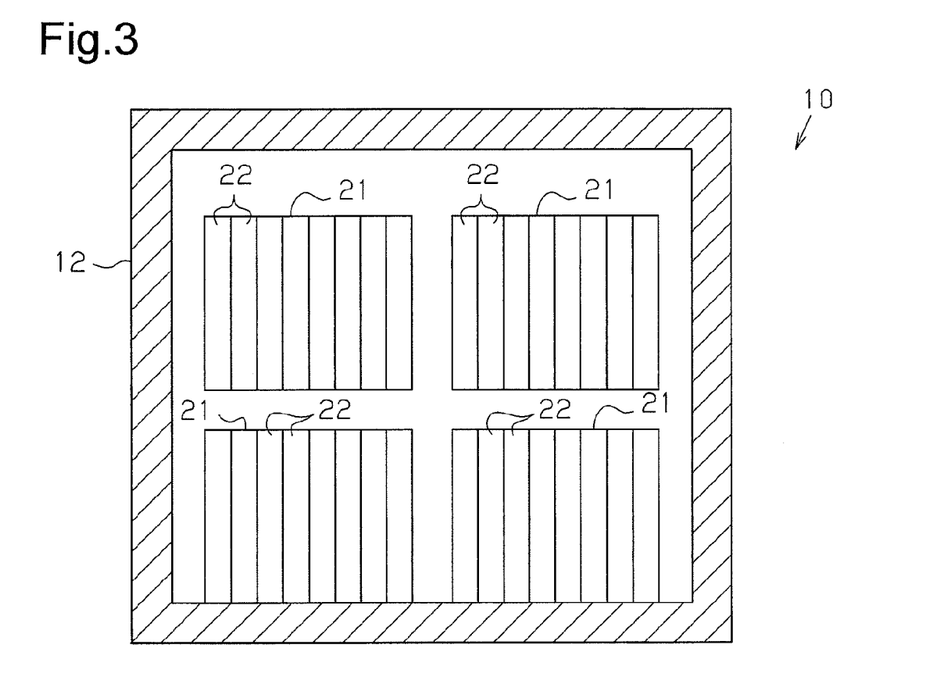
FIG. 3 is a cross-sectional view illustrating the battery pack according to the first embodiment.

As shown in FIG. 3, the battery module 21 includes a plurality of battery cells 22.

Figure 4:
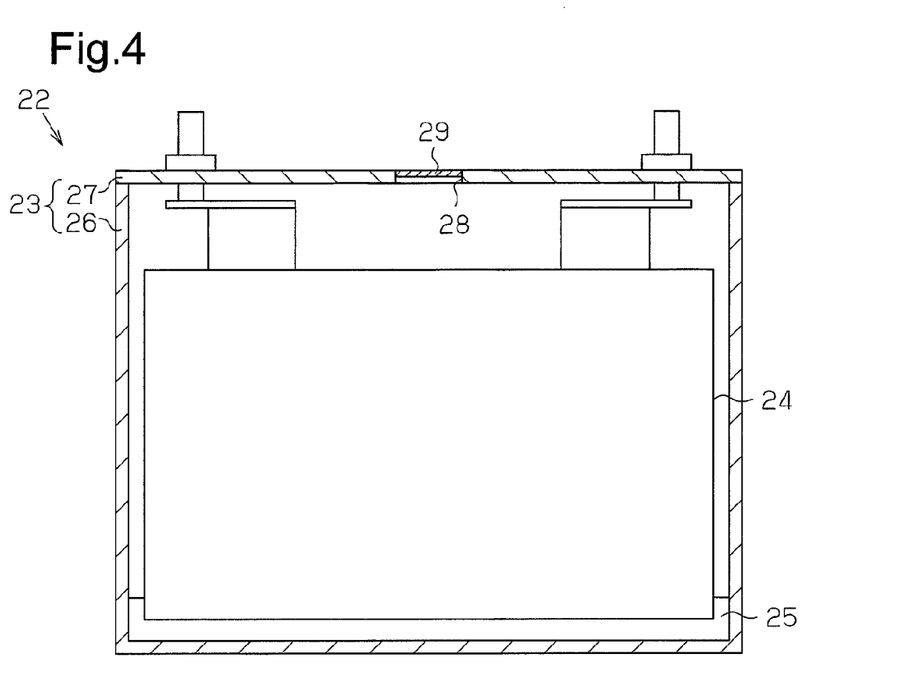
FIG. 4 is a cross-sectional view illustrating a battery cell according to the first embodiment.

As shown in FIG. 4, each battery cell 22 (for example, a rechargeable lithium-ion battery, or a nickel hydrogen storage battery) accommodates an electrode assembly 24 and electrolytic solution 25 in the cell case 23. The cell case 23 includes a box-like body 26 with a bottom, which accommodates an electrode assembly 24, and a rectangular plate-like lid 27, which closes an opening of the body 26. The lid 27 includes a hole 28, which passes through the lid 27 in the thickness direction. A valve 29, which opens when the internal pressure in the cell case 23 exceeds a specified pressure, is provided in the hole 28. The specified pressure is set such that when the internal pressure in the cell case 23 increases, the valve 29 breaks before the cell case 23 is damaged.

Next, an operation of the battery pack 10 according to the present embodiment will be described.

If abnormalities occur in the battery cell 22, gas is generated in the cell case 23 and the internal pressure in the cell case 23 increases. If the internal pressure in the cell case 23 exceeds the specified pressure, the valve 29 provided in the cell case 23 breaks. If the valve 29 provided in the cell case 23 breaks, the gas in the cell case 23, for example, hydrogen, is emitted in the sealed case 11, and the internal pressure of the sealed case 11 increases.

If the gas is emitted from the battery cells 22 and the internal pressure in the sealed case 11 increases, the pressure applied to the lid member 14 gradually increases as well. The lid member 14 tends to be deformed in the thickness direction, i.e., the direction in which the lid member 14 is separated from the opening edge portion 32. However, since the deformation of the lid member 14 is restricted by the bolts B, the lid member 14 is less likely to be deformed. A portion in which the distances between each pair of the bolts B are great, a force by which the bolts B press the lid member 14 against the case body 12 is weak. Accordingly, the portion between the first bolt B1 and the second bold B2 is most likely to be deformed.

Figure 6A:
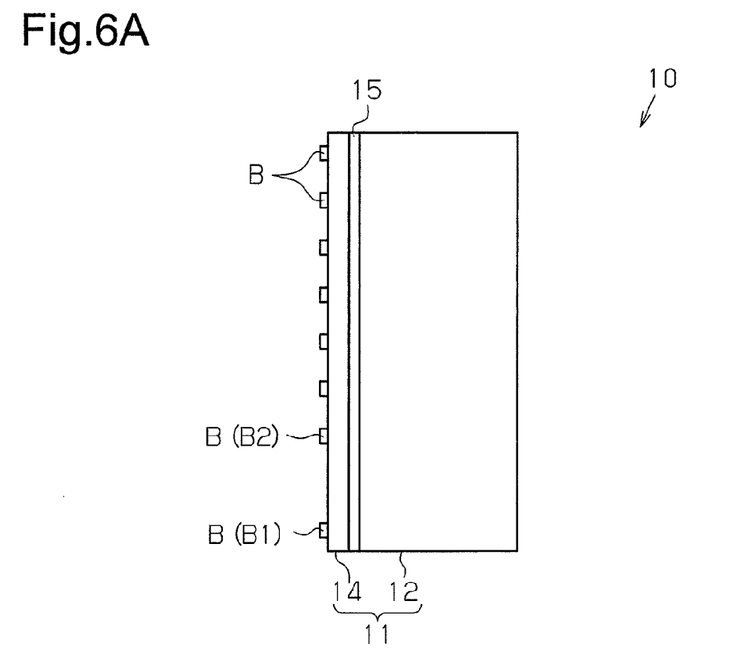
FIG. 6A is a side view illustrating the operation of the battery pack according to the first embodiment.
Figure 6B:
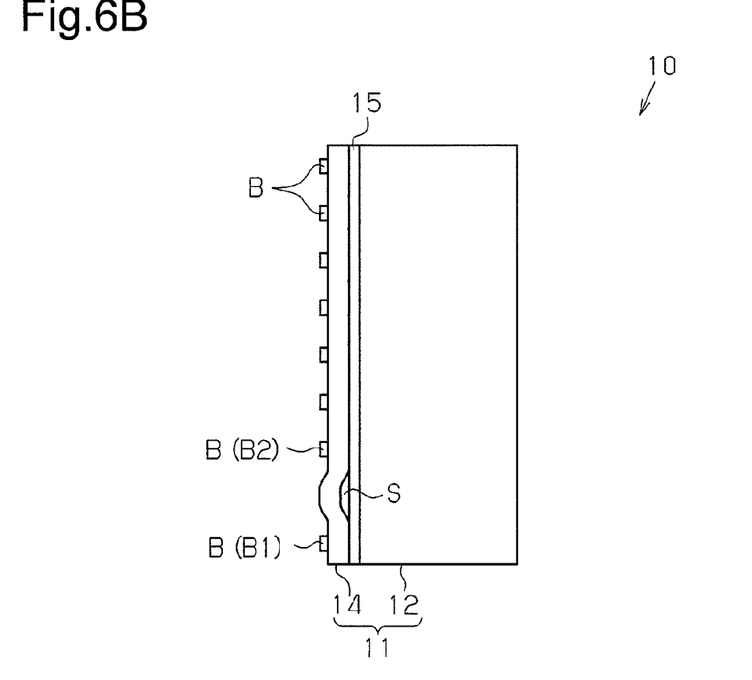
FIG. 6B is a side view illustrating the operation of the battery pack according to the first embodiment.

As shown in FIGS. 6A and 6B, if the internal pressure in the sealed case 11 increases, the portion of the lid member 14 between the first bolt B1 and second bolt B2 is deformed, in which the lid member 14 is separated from the case body 12, i.e., the thickness direction of the lid member 14. The deformation of the lid member 14 forms a gap S between the case body 12 and the lid member 14. The gas collected in the sealed case 11 is discharged outside through the gap S. When the gas is discharged out of the sealed case 11 and the internal pressure of the sealed case 11 decreases, the lid member 14 returns to its original shape (shape shown in FIG. 6A) as long as the lid member 14 does not lose its elasticity due to the deformation.

The distances between some of adjacent bolts B may be unintentionally long due to some factors such as manufacturing errors, fastening of the bolts at positions apart from members that are located around the battery pack 10, and the shape of the sealed case 11. In this case, since discharge of gas through the portion in which the distances between an adjacent pair of the bolts B is unintentionally long is not expected, the members that are located around this portion may be subjected to adverse effects by the discharged gas.

In the battery pack 10 according to the present embodiment, the distances between each pair of the bolts B are changed to intentionally provide a portion that is likely to be deformed. The portion serves as a discharge port of the gas. This locates the members that may be subjected to adverse effects of discharged gas apart from the discharge port.

The above described embodiment has the following advantages.

(1) The distance d1 between the first bolt B1 and second bolt B2 is greater than the distances d2 between each pair of the remaining bolts B. This is likely to deform a portion of the lid member 14 between the first bolt B1 and the second bolt B2 when the internal pressure in the sealed case 11 increases. This specifies a gas discharge position in which the gas is discharged only by changing the distances between each pair of the bolts B for fixing the lid member 14 onto the case body 12.

(2) The gas in the sealed case is discharged outside using an open valve of a breakable type. In this case, if the internal pressure in the sealed case 11 increases and the open valve breaks, it is necessary to replace the broken open valve to use the battery pack 10 again. According to the present embodiment, if the lid member 14 is deformed due to its elasticity, the internal pressure in the sealed case 11 decreases. If the deformation of the lid member 14 is within the range in which the lid member 14 does not lose its elasticity, the lid member 14 returns to its original shape. Accordingly, it need not replace the lid member 14 even after the gas in the sealed case 11 is emitted.

Second Embodiment

Hereinafter, a battery pack according to a second embodiment will be described.

In the second embodiment described below, like or the same reference numerals are given to those components that are like or the same as the corresponding components of the first embodiment and detailed descriptions will be omitted.

Figure 7:
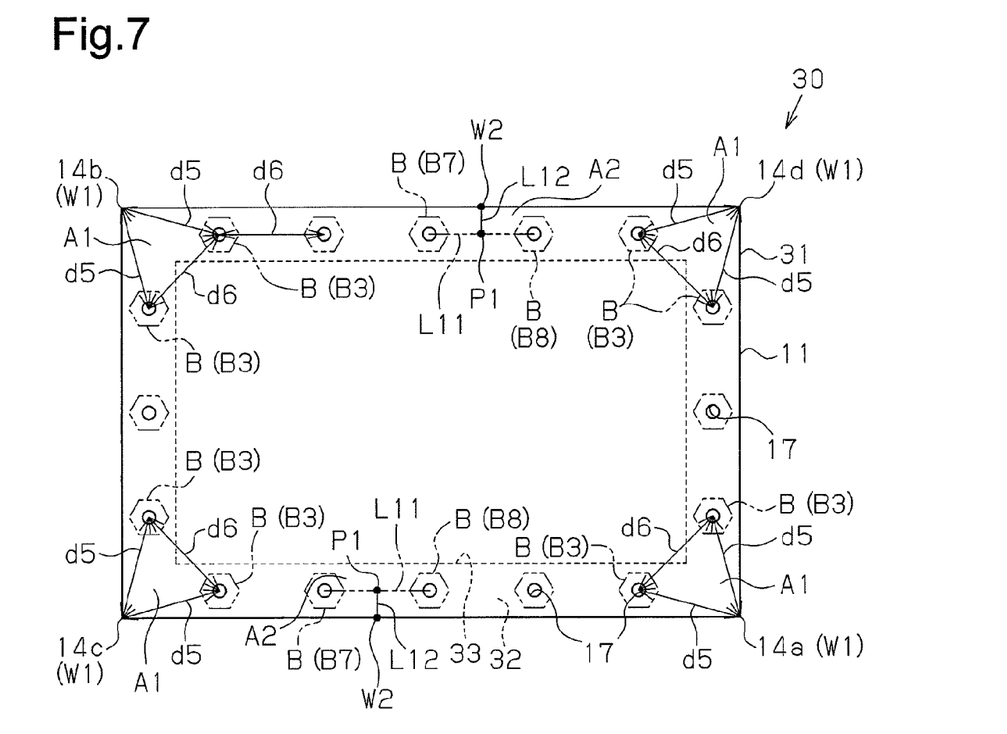
FIG. 7 is a front view illustrating a battery pack according to a second embodiment.

As shown in FIG. 7, bolts B are provided on each of four ends of a rectangular plate-like lid member 31 in a battery pack 30 according to the second embodiment. The distances d6 between each adjacent pair of the bolts B, more specifically, the distances d6 between the axes of each adjacent pair of the bolts B are even intervals. The "even intervals" here means that differences due to manufacturing errors are permitted.

If two of the bolts B that are proximate each of the corners 14a to 14d are defined as proximate bolts B3, the remaining bolts B (distant bolts) are located farther from the corners 14a to 14d than the proximate bolts B3 are. In the present embodiment, the distance d5 from each of the corners 14a to 14d to one of the two proximate bolts B3 is the same as the distance d5 from each of the corners 14a to 14d to the other one of the two proximate bolts B3. The distances d5 from each of the two proximate bolts B3 to the corresponding one of the corners 14a to 14d are the same as the distances d6 between each adjacent pair of the bolts B.

The fastening force received by the lid member 31 from the bolts B is applied to the lid member 31 from the centers of the bolts B, i.e., the axes of the bolts B. The fastening force becomes weaker at positions farther from the axes of the bolts B. The lid member 31 according to the present embodiment has first regions A1 each receiving fastening force from each of the corresponding two proximate bolts B3 at a portion facing the opening edge portion 32. In each first region A1, the portion in which the resultant force of the fastening forces received from the two proximate bolts B3 is the weakest is equivalent to corresponding one of the corners 14a to 14d. In the following description, the portion of the first region A1 in which the fastening force received from the bolts B is the weakest, i.e., each of the corners 14a to 14d is defined as the first weak region W1.

Further, the lid member 31 has second regions A2, each receiving fastening force from each of the two bolts B7 and B8 of the adjacent distant bolts B at a portion facing the opening edge portion 32. In the second region A2, a perpendicular line L12 extends from the middle point P1 of an imaginary line L11 connecting the axes of the two adjacent bolts B7 and B8 to the nearest side of the lid member 31, i.e., in the direction opposite to the opening 33 to intersect the nearest side of the lid member 31. The intersection between the perpendicular line L12 and the nearest side of the lid member 31 is defined as a second weak region W2. The second weak region W2 is equivalent to a portion facing the opening edge portion 32 in which the resultant force of the fastening forces from the two adjacent bolts B7 and B8 is the weakest.

When the first weak region W1 is compared with the second weak region W2, the fastening force applied to the first weak region W1 is weaker than the fastening force applied to the second weak region W2. Specifically, when the distances from the first weak region W1 to each of the corresponding two proximate bolts B3 are compared with the distances from the second weak region W2 to each of the corresponding two adjacent bolts B7 and B8, the distances from the first weak region W1 to each of the corresponding proximate bolts B3 are greater than the distances from the second weak region W2 to each of the corresponding two adjacent bolts B7 and B8. Accordingly, the fastening force of the proximate bolts B3 is less applied to the first weak region. The resultant force of the fastening forces received by the first weak region W1 from the corresponding two proximate bolts B3 is weaker than the resultant force of the fastening forces received by the second weak region W2 from the corresponding two adjacent bolts B7 and B8.

According to the present embodiment, in the first weak region W1 in each of the first regions A1, the resultant force of the fastening forces received from the corresponding two proximate bolts B3 is weaker than the resultant force of the fastening forces received by the second weak region W2 from the two adjacent bolts B7 and B8.

Next, an operation of the battery pack 30 according to the second embodiment will be described.

If abnormalities occur in the battery cell 22 and the gas in the cell case 23, for example, hydrogen, is emitted in the sealed case 11, the internal pressure in the sealed case 11 increases. Portions of the lid member 31 in which the fastening force received from the bolts B is weak are easily deformed. Accordingly, when the first weak region W1 is compared with the second weak region W2, the fastening force received by the first weak region W1 from the bolts B is weaker than the fastening force received by the second weak region W2 from the bolts B. Accordingly, when the internal pressure in the sealed case 11 increases, the first region A1 is deformed. If the first region A1 is deformed, the first region A1 is deformed in the direction in which the first region A1 is separated from the opening edge portion 32. This forms a gap between the opening edge portion 32 and the first region A1. When the gas in the sealed case 11 is emitted through the gap, the internal pressure in the sealed case 11 is released.

Therefore, even if the distances between each adjacent pair of the bolts B are the same as the distances from each of the corners 14a to 14d to one of the corresponding proximate bolts B3, the first region A1 is allowed to serve as a valve to release the pressure in the sealed case 11.

The embodiments may be modified as follows.

Figure 5:
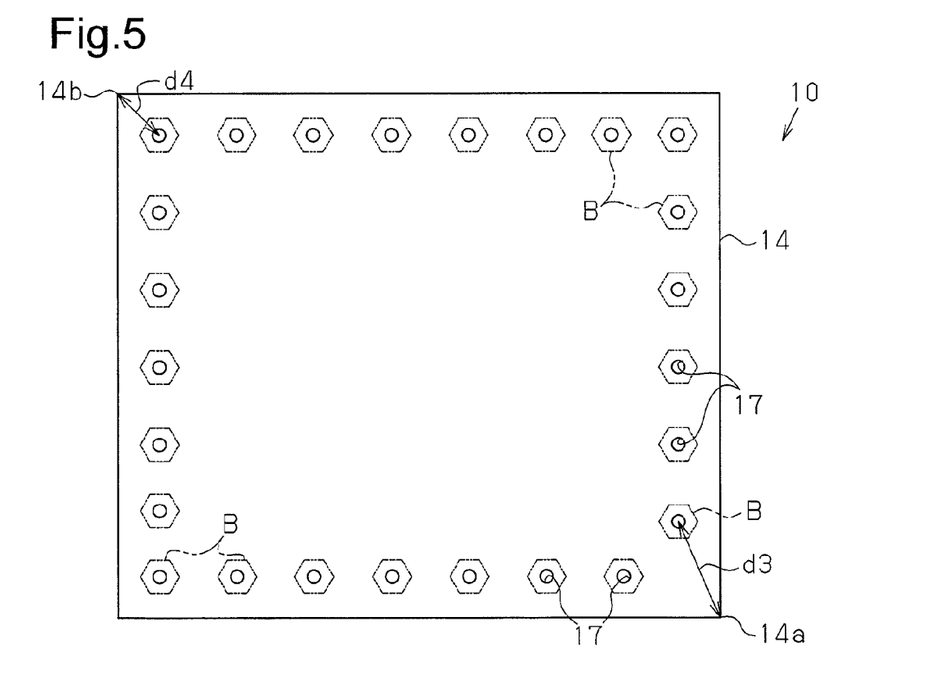
FIG. 5 is a front view illustrating a battery pack according to another embodiment.

As shown in FIG. 5, the distances between each adjacent pair of the bolts B may all be even intervals. The "even intervals" here means that a certain manufacturing error is permitted. The distance from the corner 14a to the through hole 17, which is located nearest to the corner 14a, is greater than the distance from any one of the remaining corners such as the corner 14b to the through hole 17, which is located nearest to the corner 14b. Accordingly, the distance d3 from the corner 14a to the bolt B that is located nearest to the corner 14a is greater than the distance d4 from any one of the remaining corners such as the corner 14b to the bolt B that is located nearest to the corner 14b.

The corners of the lid member 14 are more easily deformed than the other portions. The distance d3 from the corner 14a to the bolt B, which is located nearest to the corner 14a, is greater than the distance d4 from any one of the remaining corners such as the corner 14b to the bolt B, which is located nearest to the corner 14b. This reduces a pressing force against the case body 12 at the corner 14a.

Accordingly, if the internal pressure in the sealed case 11 increases, the circumference of the corner 14a is deformed the earliest. This forms a gap between the lid member 14 and the case body 12. The gas in the sealed case 11 is discharged out of the sealed case 11 through the gap. The distances from the corners to the corresponding bolts B that are the nearest to the corners may be different so that the portions of the lid member 14 are easily deformed. This reduces the internal pressure in the sealed case 11. In this case, the internal pressure in the sealed case 11 is also reduced with a simple structure.

The distances between each pair of the bolts B are even intervals. This evens the loads that are applied to the bolts B when the internal pressure in the sealed case 11 increases. Accordingly, bolts of the same size can be employed so that the stress concentration on the portions of the lid member 14 in which the bolts B are provided is reduced. The bolts B may be arranged such that the pressing force against the case body 12 at the corners other than the corner 14a is reduced.

According to the first embodiment, the distance d1 between the first bolt B1 and the second bolt B2 is twice as great as the distances d2 between each pair of the remaining bolts B. The distance d1 is not limited to this. The distance d1 may be arbitrarily defined as long as the distance d1 is greater than the distances d2.

According to the first embodiment, a set of two specified adjacent bolts (first bolt B1 and second bolt B2) is provided. However, two or more sets of the specified two adjacent bolts may be provided.

In the embodiments, the bolts B are all the same. However, a plurality of types of bolts may be used as long as the types of bolts do not affect the deformation of the lid member 14, or as long as the effects of the types of bolts are sufficiently low.

According to the first embodiment, the distances between each adjacent pair of the bolts B are the same except for the distance d1 between the first bolt B1 and the second bolt B2. However, the distances between adjacent pairs of the bolts B need not always be the same. For example, a distance between an adjacent pair of the bolts B, other than the specified two bolts B1, B2, may be greater than that between the adjacent pairs of the remaining bolts B and less than the distance between the specified two bolts B1, B2. Even in this case, the distances between each pair of the bolts B may be arbitrarily defined as long as the distance between the first bolt B1 and second bolt B2 is greater than the distances between each pair of the remaining bolts B. That is, the distances between each pair of the bolts B may be arbitrarily defined as long as the distance between the specified two adjacent bolts (first bolt B1 and second bolt B2) is the greatest.

In the embodiments, the number of the battery modules 21 may be one.

In the first embodiment, the shape of the case body 12 may be changed to any arbitrary shape such as a polygonal tubular shape including a pentagonal tubular shape and a hexagonal tubular shape, or a cylindrical shape. Further, in the second embodiment, the shape of the case body 12 may be formed in a polygonal shape such as a pentagonal tubular shape and a hexagonal tubular shape. In this case, the shape of the lid member 14 is changed in accordance with the shape of the case body 12.

According to the embodiments, the internal pressure in the sealed case 11 increases due to the gas generated when abnormalities occur in the battery cell 22. In addition, the external pressure of the sealed case 11 is reduced when the battery pack 10 is transported by air so that the internal pressure in the sealed case 11 increases relative to the external pressure. Otherwise, the air in the sealed case 11 is heated by solar heat so that the internal pressure increases. Even in such a case, when the internal pressure in the sealed case 11 increases, the portion of the lid member 14 between the first bolt B1 and the second bolt B2 is deformed so that the internal pressure in the sealed case 11 is reduced.

In the second embodiment, the distances between each adjacent pair of the two bolts B may be different.

In the second embodiment, the distances between each adjacent pair of the two bolts B may be arbitrarily defined as long as the resultant force of the fastening forces of the two proximate bolts B3 received by the first weak region W1 of at least one of the first regions A1 is smaller than the resultant force of the fastening forces of the two adjacent bolts B7 and B8 received by the second weak region W2.

In the second embodiment, the distance d5 from each of the corners 14a to 14d to one of the corresponding two proximate bolts B3 and the distance d5 from each of the corners 14a to 14d to the other one of the corresponding two proximate bolts B3 may be different. That is, if two bolts B are located nearest to each of the corners 14a to 14d, the two proximate bolts B3 correspond to the two bolts B. If only a single bolt B is located nearest to each of the corners 14a to 14d, the single bolt B located nearest to each of the corners 14a to 14d and a bolt B that is located second nearest to each of the corners 14a to 14d correspond to the two proximate bolts B3.

In the second embodiment, any one of the two adjacent bolts B may be located at positions shifted toward the opening 33. In this case, the distance from one of the two adjacent bolts B to the second weak region W2 is different from the distance from the other one of the two adjacent bolts B to the second weak region W2.

In the second embodiment, the distances between each pair of the adjacent bolts B may be different. The distance from each one of the corners 14a to 14d to one of the corresponding proximate bolts B3 may be different from the distances between each pair of the bolts B.

What is claimed is:

1. A battery pack comprising:
   a sealed case; and
   a battery cell accommodated in the sealed case, wherein the sealed case includes:
   a case body, which has an opening;
   a lid member, which is fixed to the case body by a plurality of bolts and closes the opening; and
   a sealing member provided between the case body and the lid member on an entire periphery of the case body and the lid member, the sealing member being configured to maintain a sealing function even if an internal pressure in the sealed case exceeds a specified pressure that deforms the lid member, wherein
   when distances between adjacent bolts are compared, a distance between a specific adjacent pair of the bolts is greater than a distance between any other adjacent pair of the remaining bolts.

2. A battery pack comprising:
   a sealed case; and
   a battery cell accommodated in the sealed case, wherein the sealed case includes:
   a case body, which has an opening; and
   a polygonal lid member, which is fixed to the case body by a plurality of bolts that are aligned at even intervals and closes the opening, and
   in the lid member, a distance from at least one corner to a corresponding nearest bolt is greater than a distance from any one of the remaining corners to a corresponding nearest bolt.

3. A battery pack comprising:
   a sealed case; and
   a battery cell accommodated in the sealed case, wherein the sealed case includes:
   a case body, which has an opening;
   a polygonal lid member, wherein the lid member is provided on an opening edge portion, which defines the opening of the case body, and closes the opening; and a plurality of bolts, which fasten the lid member onto the opening edge portion, wherein the bolts include two proximate bolts that are close to one corner of the lid member and a plurality of distant bolts provided at positions farther from the one corner than the two proximate bolts are, the lid member includes a first region, which receives a fastening force from each of the two proximate bolts at a portion facing the opening edge portion, and a second region, which receives a fastening force from each of two adjacent distant bolts, and a fastening force of a portion of the first region in which a resultant force of the fastening force received from each of the two proximate bolts is the weakest is weaker than a fastening force of a portion of the second region in which a resultant force of the fastening force received from each of the two adjacent distant bolts is the weakest.

4. The battery pack according to claim 1, wherein each of the plurality of bolts is the same size.

5. The battery pack according to claim 2, wherein each of the plurality of bolts is the same size.

6. The battery pack according to claim 3, wherein each of the plurality of bolts is the same size.

7. The battery pack according to claim 3, wherein a distance from the weakest point of the first region to each of the proximate bolts is greater than a distance from the weakest point of the second region to each of the adjacent distant bolts.

8. A battery pack comprising:

a sealed case; and a battery cell accommodated in the sealed case, wherein the sealed case includes:

a case body, which has an opening; and a lid member, which is fixed to the case body by a plurality of bolts and closes the opening, wherein when distances between adjacent bolts are compared, a distance between a specific adjacent pair of the bolts, one of the specific adjacent bolts being provided at a corner of the sealed case, is greater than a distance between any other adjacent pair of the remaining bolts.

\* \* \* \* \*